June 18, 1968  J. SPATENEDER  3,388,551
SAFETY DEVICE FOR AIRCRAFT CONSTRUCTION
Filed April 4, 1967  2 Sheets-Sheet 1
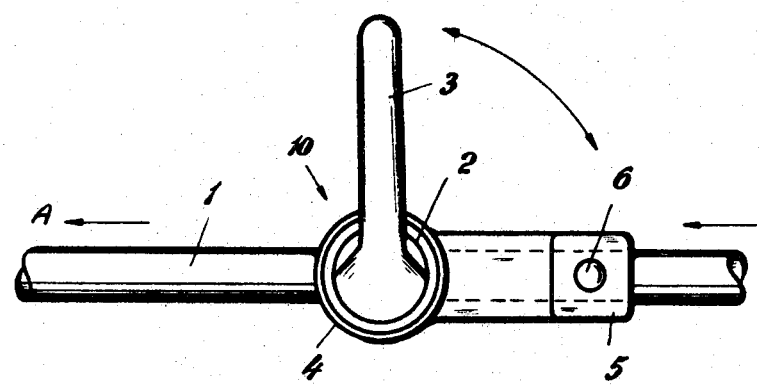
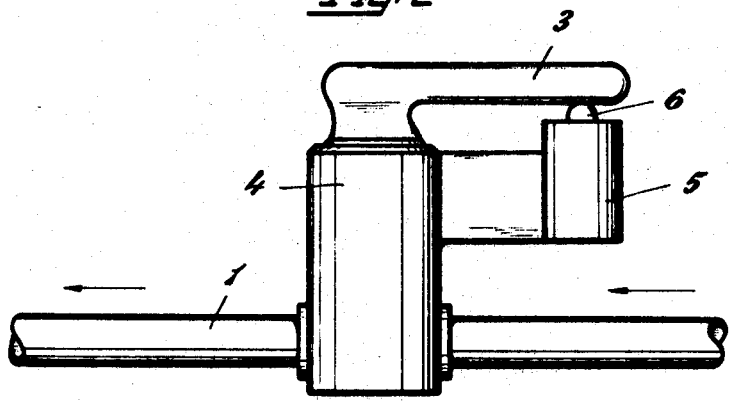
INVENTOR
Josef SPATENEDER
ATTORNEYS June 18, 1968   J. SPATENEDER   3,388,551
SAFETY DEVICE FOR AIRCRAFT CONSTRUCTION
Filed April 4, 1967   2 Sheets-Sheet 2
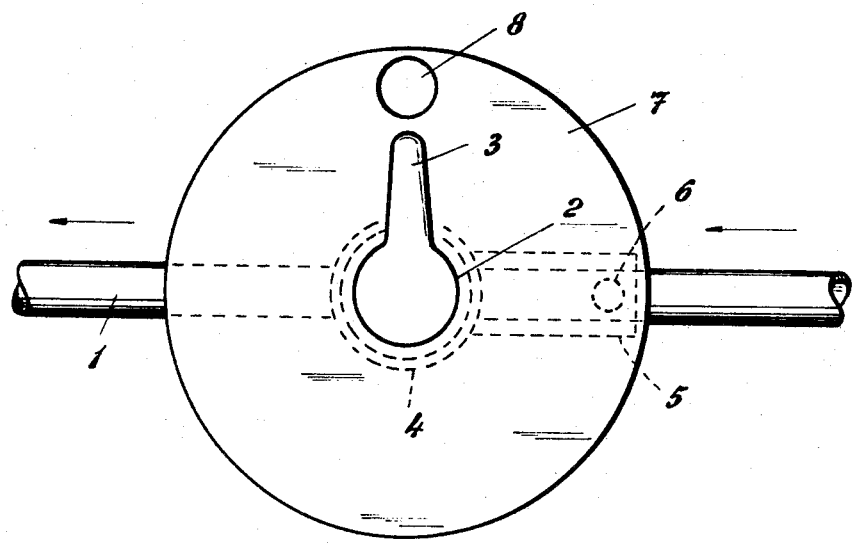
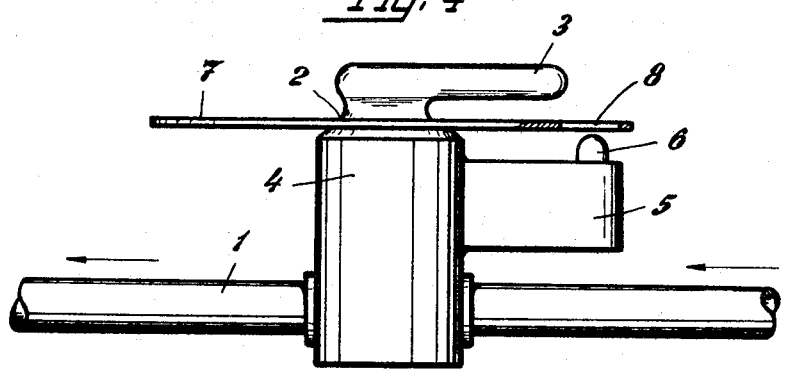
INVENTOR
JOSEF SPATENEDER
ATTORNEYS 3,388,551
SAFETY DEVICE FOR AIRCRAFT
CONSTRUCTION
Josef Spateneder, Machendorf, near Simbach, Germany
Filed Apr. 4, 1967, Ser. No. 628,359
4 Claims. (Cl. 60—39.14)

ABSTRACT OF THE DISCLOSURE

The invention discloses a safety arrangement for preventing the inadvertent starting of aircraft engines when the fuel valve of the fuel line is closed. The actuating means for the fuel valve are interrelated with the starter circuit of the engine so that the starter circuit is always in open position when the fuel line is closed by the fuel valve. When the fuel valve is in the open position, the actuating means or handle for the fuel valve either automatically moves a switch or contact element of the starter circuit into a position in which the starter circuit can be actuated or it causes an associated disk element having a hole to move into a position in which the starter circuit can be actuated.

Summary of the invention

This invention generally relates to aircraft having fuel burning engines and is particularly directed to an aircraft construction wherein safety means are provided for preventing the starting up of the engine when the fuel line supplying the engine with fuel is closed.

During recent years it has repeatedly occurred that aircraft engines have been started up by the pilot with the fuel line being blocked by the fuel valve. Since minor amounts of fuel are always present in the carburetor, or in the injection pumps and in the fuel line between the fuel valve and the engine, it is normally possible to start the engine and to take off from the ground even if the fuel valve is closed. Such mistakes have resulted in serious accidents since the engine, of course, suddenly stalls once the fuel supply has been used up. If the stalling takes place after lift off, the aircraft, of course, crashes.

It is a primary object of this invention to provide an arrangement which renders it impossible to start the aircraft engine when the fuel valve of the fuel line is closed.

Briefly, and in accordance with this invention, a switch or contact member is provided in the starter circuit of the aircraft engine which is interrelated with a manually operable actuating member of the fuel valve in such a manner that the switch or contact member prevents actuation of the starter circuit when the actuating member of the fuel valve is in a position in which the fuel valve is closed, to wit, blocks the flow of fuel to the engine.

According to one embodiment of the invention, the interrelation between the fuel valve actuating member and the switch or contact member arranged in the starter circuit is such that the switch is automatically in closed position, enabling actuating of the starter circuit, when the actuating member of the valve is in open position, to wit, the position in which fuel may flow to the engine. According to another embodiment, the interrelating means are constructed in such a manner that in the open position of the actuating member, the switch or operating member of the starter circuit is merely made accessible for starting purposes, but still must be actuated before actual startup of the engine can take place.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Brief description of the drawings

In the drawings:
FIG. 1 shows in somewhat diagrammatic manner and in plan view the fuel valve of an aircraft engine with the valve being closed;
FIG. 2 is a side view corresponding to FIG. 1 with the valve however in open position;
FIG. 3 is a top view of a second embodiment with the valve being closed; and
FIG. 4 is a side view corresponding to FIG. 3 with the valve being open.

Detailed description

Referring now to the drawings and in particular to FIG. 1, reference numeral 1 indicates the fuel line of an aircraft construction serving as a conduit for conveying fuel from the fuel tank to the engine of the aircraft. A fuel valve, generally indicated by reference numeral 10, is provided in the line, the fuel valve comprising a casing or body portion 4 in which is movable the plug or valve body 2 having an operating handle or member 3. In the position shown in FIG. 1, to wit, with the handle 3 extending perpendicular to the line 1, the valve is closed and no fuel can flow from the fuel tank (not shown) in the direction of the arrow A to the engine (not shown). In order to open the valve to permit flow of fuel, the handle has to be turned about 90° into the position shown in FIG. 2. The valve casing 4 is provided with a projecting structure 5. A contact or switch member 6 is springily arranged in the structure 5. The switch 6 is located within the starter circuit (not shown) of the aircraft engine. The switch 6 is normally urged by the spring means (not shown) into the position shown in FIG. 1 in which the switch projects above the structure 5 and in which the starter circuit cannot be started. It should be noted that the switch 6 is within the path of movement of the actuating handle 3 of the fuel valve and when the fuel valve is moved into the position shown in FIG. 2 in which the valve is open, the handle 3 depresses the switch 6 toward and into the structure 5 thereby closing the starter circuit and permitting actuating thereof. Thus, when the handle 3 is in the position of FIG. 1, the switch or contact member 6 is in a position in which the starter circuit cannot be actuated while in the position of FIG. 2 in which the handle opens the fuel valve, the contact member is depressed to close the starter circuit, thereby permitting actuation of the starter circuit in the usual manner by a push button or the like. The inventive arrangement thus automatically prevents starting or actuating of the starter circuit when the fuel valve is closed while permitting actuation of the starter circuit when the fuel valve is open.

Turning now to FIGS. 3 and 4 which show a second embodiment, it will be noted that a disk 7 is rigidly connected with or fast on the plug member 2 of the fuel valve. The disc, at one area, has a hole 8 of a size sufficient to insert a finger. Reference numeral 6 indicates a push button for the starter circuit of the engine. When the actuating handle is in the position of FIG. 3, the disk overlies but does not contact the starter button 6 and, consequently, the starter circuit cannot be actuated since the hole 8 in this position is at a different location. In this position, to wit, the position of FIG. 3, the fuel line is closed. When the handle 3 is turned by 90° into the position of FIG. 4, the fuel line is open and the hole 8 is in alignment with the starter button 6. By inserting a finger through the hole 8 and depressing the button 6, the engine can thus be started.

While specific embodiments of the invention have been shown and described in detail to illustrate the application of the inventive principles, it will be understood that the invention may be embodied otherwise without departing from such principles.

What is claimed is:

1. In an aircraft having an engine, a fuel line supplying fuel to said engine, valve means in said fuel line, respectively permitting and blocking flow of fuel to said engine and a starter circuit for said engine, the improvement which comprises that said valve means has a manually operable actuating member movable between a first position in which said valve means permits flow of fuel and a second position in which the flow of fuel is blocked, and means interrelating said actuating member and said starter circuit in a manner such that said starter circuit is always open when said actuating member is in said second position.

2. The improvement as claimed in claim 1, wherein said interrelating means comprises a contact member forming part of said starter circuit, said contact member normally being in a position in which the starter circuit is open and being provided in the path of movement of said actuating member, said actuating member in its first position moving said contact member from its normal position into a position in which the starter circuit is closed.

3. The improvement as claimed in claim 2, wherein said contact member is a spring loaded button.

4. The improvement as claimed in claim 1, wherein said interrelating means comprises a disk connected to said actuating member and movable therewith, said disk having a hole, said interrelating means further comprising a switch member forming part of said starter circuit, said switch member being normally in an open position and located below said disk thereby preventing access to said switch member, the hole of said disk being in alignment with said switch member when the actuating member is in said first position, thereby permitting access for actuation of said switch member to close said starter.

References Cited

UNITED STATES PATENTS 2,570,591  10/1951  Price _____ 60—39.14
2,893,369  7/1959  Sampietro.

FOREIGN PATENTS 159,371  8/1953  Australia.
814,522  6/1959  Great Britain.

WENDELL E. BURNS, *Primary Examiner.*